United States Patent

Hoftman

[19]

[11] Patent Number: 5,871,189
[45] Date of Patent: Feb. 16, 1999

[54] O.R./ANESTHESIA/YANKAUER HOLDER

[76] Inventor: Moshe Hoftman, Calabasas, Calif.

[21] Appl. No.: 811,201

[22] Filed: Mar. 5, 1997

Related U.S. Application Data

[60] Provisional application No. 60/012,838 Mar. 5, 1996.

[51] Int. Cl.$^6$ ................................................. A47B 96/06
[52] U.S. Cl. .................................. 248/229.16; 248/231.81
[58] Field of Search .......................... 248/229.26, 205.3, 248/229.16, 231.81, 316.7, 214; 128/DIG. 26; 604/180; 5/658, 503.1

[56] References Cited

U.S. PATENT DOCUMENTS

| | | | |
|---|---|---|---|
| 2,918,244 | 12/1959 | Laney ................................ | 248/316.7 X |
| 2,990,150 | 6/1961 | Weigel et al. .................... | 248/316.7 X |
| 3,747,166 | 7/1973 | Eross ................................ | 248/229.26 X |
| 3,778,537 | 12/1973 | Miller .............................. | 248/229.26 X |
| 3,946,877 | 3/1976 | Galicia ............................. | 248/205.3 X |
| 4,707,906 | 11/1987 | Posey .......................... | 128/DIG. 26 X |
| 5,005,793 | 4/1991 | Shillington ........................ | 248/231.81 |

*Primary Examiner*—Ramon O. Ramirez

[57] ABSTRACT

This invention is a simple, low cost, disposable plastic device which is removably secured to an O.R. table side rail. Such slide rails are well known in the art and generally have cross section dimensions of greater than about 0.5 cm by 2.0 cm. The holder of the present invention comprises a rail engaging portion and a catheter/tube engaging portion. The rail engaging portion further comprises upper and lower rail engaging lugs defining an open slot into which the side rail is releasably engaged. The catheter/tube engaging portion comprises two opposing rectangular engaging wings of flexible plastic curved symmetrically with respect to a dividing central plane between the opposing engaging wings.

3 Claims, 3 Drawing Sheets

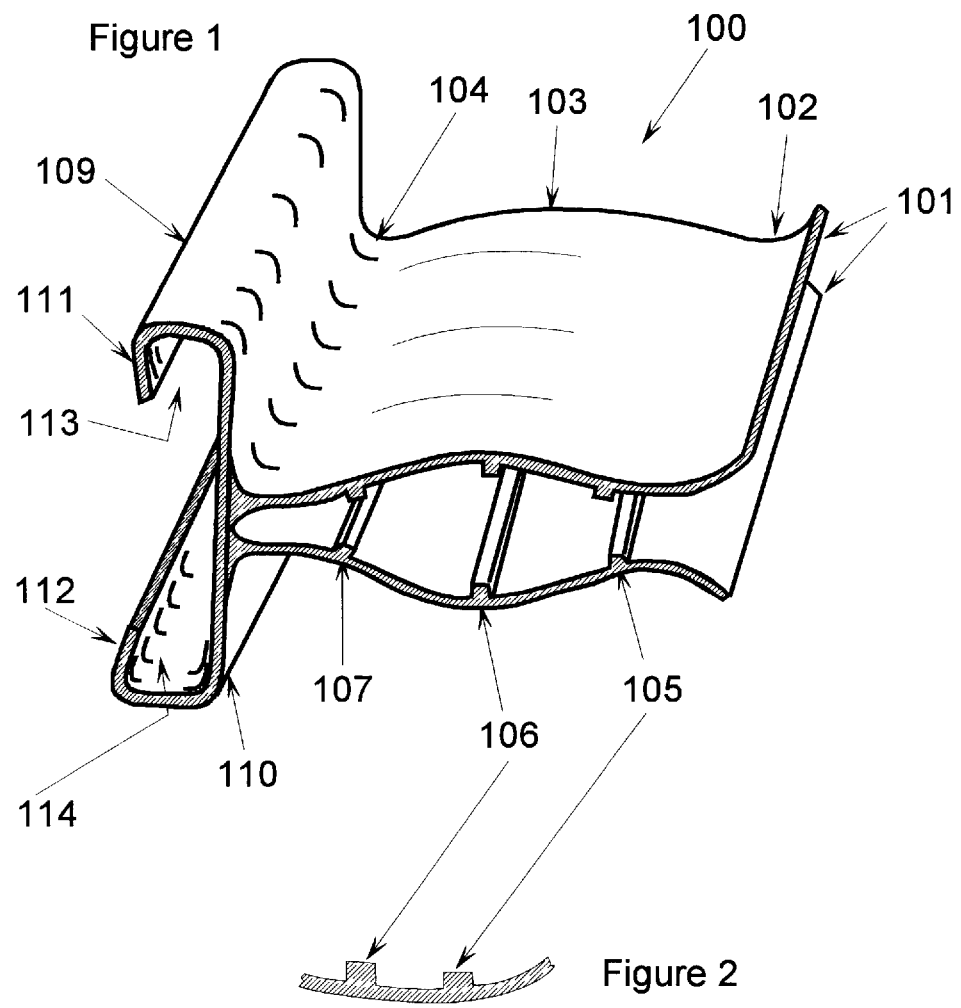
Figure 1
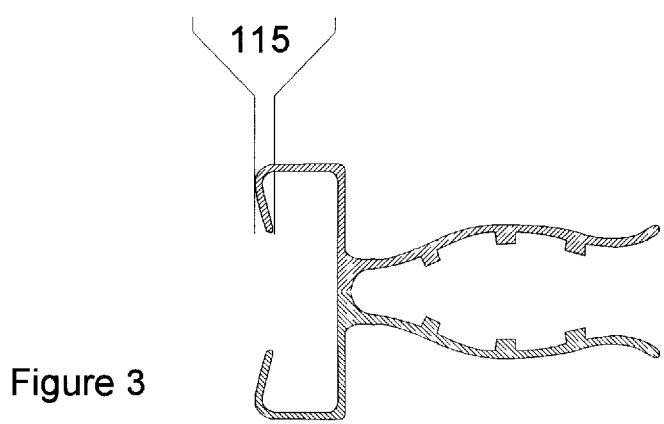
Figure 2
Figure 3

O.R./ANESTHESIA/YANKAUER HOLDER

This application claims benefit of and incorporates herein the Provisional Patent Application No. 60/012,838 filed Mar. 5, 1996.

BACKGROUND OF THE INVENTION

The present invention relates to catheter, tube, electrosurgical knife and suction device holders for surgery.

During surgical procedures, an anesthesiologist draws away mucus, saliva and other body fluids such as blood by suction from the patient's mouth and nose. The apparatus used for the continuous or intermittent suctioning operation comprises a catheter capable of withstanding vacuum for drawing viscous liquid through about 2 or more feet of such catheter or tubing to a catch bottle, a Yankauer tip or handle adapted for suctioning or similar rigid or semi-rigid device attached to the free end of the suction tubing, and a vacuum pump drawing liquid into the catch bottle. The anesthesiologist and/or OR personnel are assigned to do more than hold the catheter and suction tip an appropriate location, so that the catheter and suction tip are often merely laid alongside the patient on the OR table. Often, the suction tip and catheter fall to the floor and are unacceptably contaminated and must be replaced immediately, causing unnecessary rummaging about for a new catheter and suction tip.

In addition, a surgical procedure may require that the Yankauer tip or handle and associated suction tubing or electrosurgical knife and electrical cord be maintained in the sterile field. The suction tubing or electrical cord are sometimes merely secured under the O.R. mattress by pressure of the patient on the mattress, increasing the likelihood of contamination and cross-infection.

SUMMARY OF THE INVENTION

This invention is a simple, low cost, disposable plastic device which is removably secured to an O.R. table side rail. Such slide rails are well known in the art and generally have cross section dimensions of greater than about 0.5 cm to 2.0 cm. The holder of the present invention comprises a rail engaging portion and a catheter/tube engaging portion. The rail engaging portion further comprises upper and lower rail engaging lugs defining an open slot into which the side rail is releasably engaged. The catheter/tube engaging portion comprises two opposing rectangular engaging wings of flexible plastic curved symmetrically with respect to a dividing central plane between the opposing engaging wings.

In one embodiment, the opposing engaging wings are adapted to hold catheters or tubes substantially parallel with respect to the side rail. With respect to this last embodiment, it is preferred to adapt each of the opposing faces of the engaging wings with three straight securing ribs rising about 0.1–0.3 cm from the opposing face, parallel to each other, reaching substantially from one edge of the opposing face to the opposite edge and aligned in a securing direction for catheters and tubes.

In another embodiment, the opposing engaging wings are adapted to hold catheters or tubes substantially perpendicular with respect to the side rail. With respect to this last embodiment, it is preferred to adapt each of the opposing faces of the engaging wings with four straight securing ribs rising about 0.1–0.3 cm from the opposing face, parallel to each other, reaching substantially from one edge of the opposing face to the opposite edge and aligned in a securing direction for catheters and tubes. It is a further improvement of this embodiment that the engaging wings attach to the rail engaging portion forming a V-shape at the point of attachment and that four, short securing lugs oppose each other on the opposing faces in pairs close to the inside bottom part of the V-shape to engage and/or secure flexible catheter walls such that the catheter may easily be secured after sliding it back and forth to adjust for a usable and available catheter length.

Once slipped over the side rail, the holder of the present invention holds onto the side rail by pressure created by opposing walls of the upper and lower rail engaging lugs, although the holder can be easily moved along the rail with a one hand. Securing a catheter or tube (suction tip) between engaging wings by the anesthesiologist or OR personnel by pressing or sliding is also done with one hand. The flexible engaging wings hold the catheter or tube by pressure and friction. The catheter can be easily pulled out from the jaws when needed with one hand and slipped back for easy and secure holding.

This simple device will save hospitals money of replacing tubes/catheter or Yankauer suction tips. It is also made simply by one step plastic molding using low cost plastics.

BRIEF DESCRIPTION OF THE DRAWINGS

FIG. 1 is an oblique top view of the rail engaging holder of the present invention.

FIG. 2 shows a short, broken-out side view of the catheter engaging portion of the holder in FIG. 1.

FIG. 3 is a side view of the holder of FIG. 1.

DETAILED DESCRIPTION OF THE INVENTION

Figure 4:
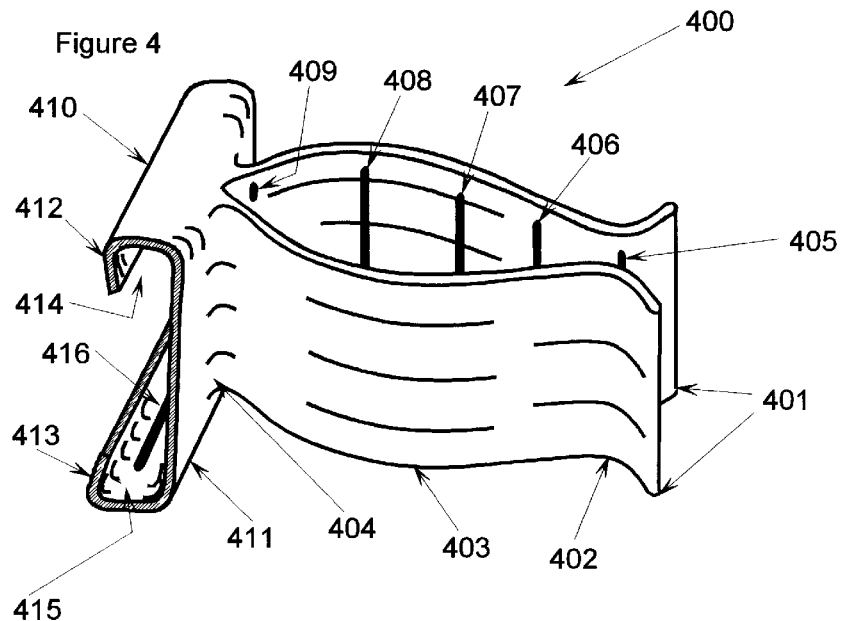
FIG. 4 an oblique top view of an alternate embodiment the rail engaging holder of the present invention.

The present invention is now discussed with reference to the above figures.

In FIG. 1, holder 100 is shown comprising wings 101 attached to upper and lower rail engaging portions 109 and 110 at an integral attachment 104. It will be seen that wings 101 form symmetrically identical shapes about a plane dividing the space between them. Wings 101 each comprise opening flare 102 which narrows the space between wings 101 and then expands to form catheter/tube curvature 103, which then extends to attachment 104. Securing ribs 105, 106 and 107 extend parallel to each other and perpendicular to the two open edges of wings 101. Securing ribs 105–107 preferably comprise a substantially rectangular cross-section as seen in FIG. 2.

In FIG. 1, upper and lower rail engaging portions 109 and 110 comprise planar J-shaped extensions from attachment 104, wherein the lower ends 111 and 112 of the hook portion of the J-shape are accentuated inwardly to urge toward and a create pressure against a side rail to be located in upper and lower rail spaces 113 and 114. The opposing open edges of lower ends 111 and 112 define an open slot into which a side rail is intended to be engaged and thereby secured. In FIG. 3, the inward accentuation of the J-shape is shown with the distance 115.

In FIGS. 1–3, securing rib 105 is preferably located just alongside the closest opposing faces of opening flare 102, so that insertion or removal of a catheter or tube will be accommodated with smooth surfaces at the narrowest point open distance between wings 101.

Figure 5:
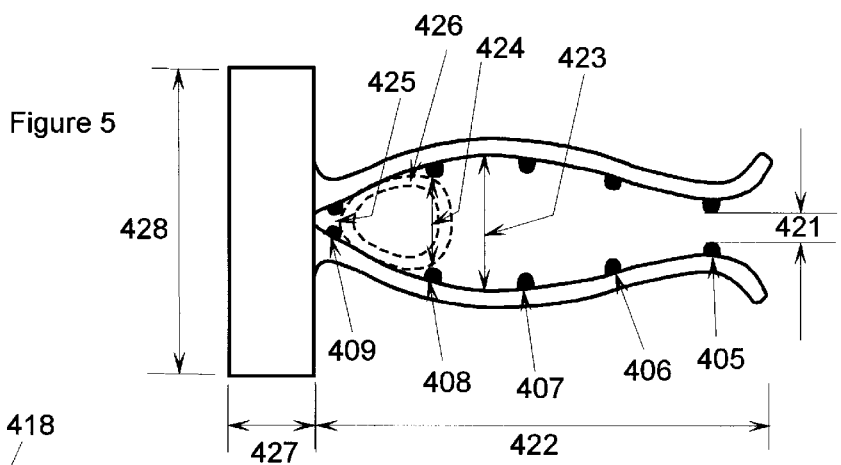
FIG. 5 is a top view of the holder of FIG. 4.

In FIG. 4, holder 400 is shown comprising wings 401 attached to upper and lower rail engaging portions 410 and 411 at an integral attachment 404. It will be seen that wings 401 form symmetrically identical shapes about a plane dividing the space between them. Wings 401 each comprise opening flare 402 which narrows the space between wings 401 and then expands to form catheter/tube curvature 403, which then extends to attachment 404. Securing ribs 405, 406, 407 and 408 extend parallel to each other and perpendicular to the two open edges of wings 401. Securing ribs 405–408 preferably comprise a substantially semi-circular or curved cross-section as seen in FIG. 5.

Two opposing pairs of catheter securing lugs 409 comprise individual lugs of similar cross section, symmetry and alignment as securing ribs 405–408, although catheter securing lugs 409 are preferably about 0.3–0.5 cm. Catheter securing lugs 409 each have one end relatively close to opposite open edges of wings 401, similar to having removed a substantial portion the center length of a securing rib of this embodiment. Catheter securing lugs 409 are located at an effective distance from the opposing faces of the V-shape formed from wings 401 at attachment 404 such that a catheter 426 engaged as shown in broken line cross section in FIG. 5 may be easily moved up and down in its perpendicular orientation to the side rail by eliminating a substantial part of the securing rib for catheter securing lugs 409 although maintaining that securing length for securing ribs 408.

In FIG. 4, upper and lower rail engaging portions 410 and 411 comprise planar J-shaped extensions from attachment 404, wherein the lower ends 412 and 413 of the hook portion of the J-shape are accentuated inwardly to urge toward and a create pressure against a side rail to be located in upper and lower rail spaces 414 and 415. The opposing open edges of lower ends 412 and 413 define an open slot into which a side rail is intended to be engaged and thereby secured. In FIG. 3, the inward accentuation of the J-shape is shown with the distance 115.

Figure 6:
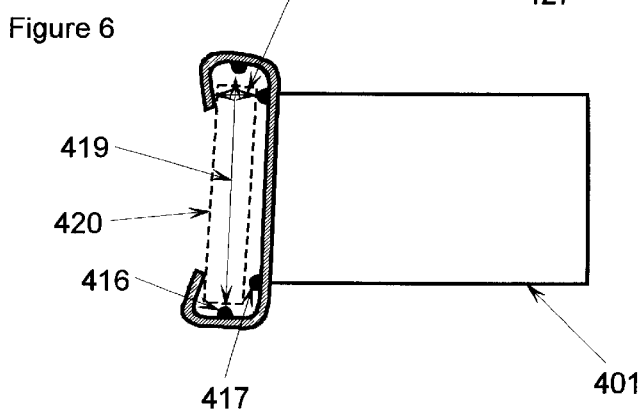
FIG. 6 is a side view of the holder of FIG. 4.

FIG. 4 and 6 show rail securing/slider ribs 416 and 417, which are intended to be extensions of upper and lower rail engaging portions 410 and 411 extending into the upper and lower rail spaces 414 and 415 as parallel ribs similar to the securing ribs 405–408. It is preferable however, that rail securing/slider ribs 416 and 417 have a length of only about greater than 0.5 cm such that sliding of the holder 400 along a side rail will be accomplished with minimal friction while increasing opposing pressure on the side rail. It will be seen that side rail 420 (shown in broken line cross section) engages substantially only the lower edge of the J-shaped upper and lower rail engaging portions 410 and 411 and rail securing/slider ribs 416 and 417 in distance 418 and 419.

In FIG. 5, distance 423 is adapted to secure larger diameter suction devices, such as those with a diameter of over about 1.0 cm, while distance 424 is adapted to secure smaller diameter suction devices and catheters, such as those with a diameter greater than about 0.5 cm. Distance 425 between catheter securing lugs 409 is preferably less than about 0.4 cm, and more preferably about 0.2 cm. This smaller space easily secures the electrical cord of an electrosurgical knife.

Figure 7:
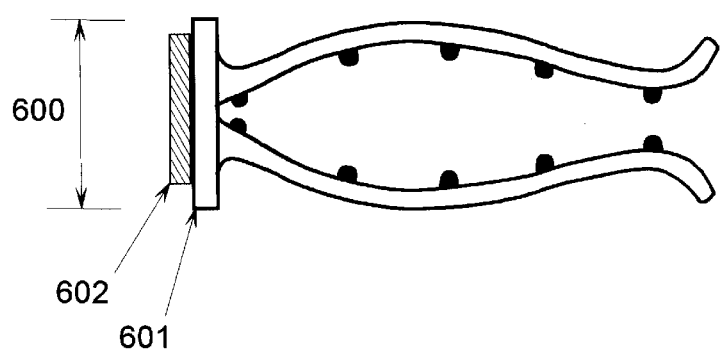
FIG. 7 is a top view another embodiment of the present invention with substantially the same catheter, tube or Yankauer handle holder as that shown in FIG. 5 although adapted with adhesive tape to stick to a surface such as an O.R. sheet or drape to more proximally locate the holder to the face of a surgery patient.
Figure 8:
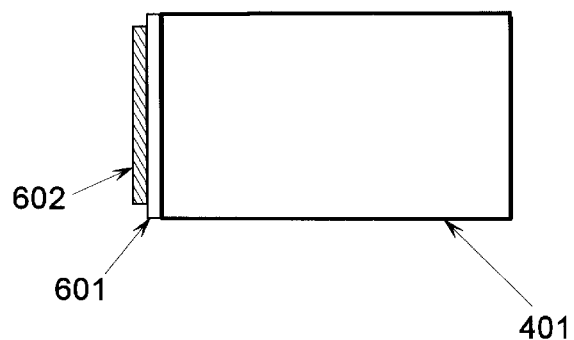
FIG. 8 is a side view of the holder of FIG. 7.

The catheter/tube engaging portion of FIG. 7 are as shown and described in FIGS. 4, 5 and 6. However, for FIG. 7, the rail engagement portion in FIGS. 4, 5 and 6 is replaced with a simple flat or slightly curved plate 601 with width 600 (preferably about 1.0 cm, although any width from 0.5 cm to severaly centimeters is appropriate) adapted to have tape 602 (preferably a synthetic foam with adhesive on both sides) applied to the side of plate 601 opposite the catheter/tube engaging portion. This tape 602 is shown in FIG. 602 extending down the length of plate 601. In use, a removable thin strip will cover the adhesive face of tape 602 opposite that used to adhere to plate 601, and the thin strip will be removed so that the holder of this embodiment can be adhered to or secured to an O.R. sheet or drape, preferably in the sterile field.

Those design options will sometimes present the designer with considerable and wide ranges from which to choose appropriate modifications for the above examples. However, the objects of the present invention will still be obtained by the skilled person applying such design options in an appropriate manner.

I claim:

1. A catheter/tube holder releasably attachable to the side rail of an operating room table comprising:

(a) a catheter/tube engagement portion comprising engagement wings forming substantially rectangular shapes curved symmetrically opposite each other about a plane dividing the space between them and adapting the curvatures thereof to secure a first catheter of diameter about 0.5 cm and above and at the same time a suction device of diameter above about twice the diameter of the first catheter, the adaptation of the curvatures further comprising at least two sets of symmetrically and directly opposing securing ribs, each such securing rib extending inward from an inner surface of the engagement wings' curvature at a tangent line of the curvature, whereby a distance between the nearest surfaces of a first set of opposing securing ribs is substantially less than the diameter of the first catheter and such securing rib separation is adapted to permit passage between the first set of opposing securing ribs the first catheter and thereafter maintaining its securement within a first space between the engagement wings curvature past the first set of opposing securing ribs such that the suction device with a diameter of above about twice the diameter of the first catheter may be secured and released in a second space between the engagement wings curvature without interfering with the securement of the first catheter in the first space;

(b) upper and lower side rail engagement portions comprising planar, J-shaped pieces integrally joined at the top edges of the J-shapes and adapted to form an open slot and secure an operating room side rail therein; and (c) an integral joint joining the catheter/tube engagement portion to the upper and lower side rail engagement portions such that catheters and suction devices are held substantially parallel with respect to the operating room side rail.

2. The catheter/tube holder of claim 1 wherein a set of securing lugs is adapted to lie in a substantially parallel relationship to the first set of opposing securing ribs and define a part of the first space whereby the distance between the securing lugs is about 0.2 to 0.4 cm and is adapted to define part of a third space between the engagement wings curvature adapted to releasably secure therein the electrical cord of an electrosurgical knife.

3. A catheter/tube holder releasably attachable to the side rail of an operating room table comprising:

(a) a catheter/tube engagement portion comprising engagement wings forming substantially rectangular shapes curved symmetrically opposite each other about a plane dividing the space between them and adapting the curvatures thereof to secure a first catheterfs of diameter about 0.5 cm and above and at the same time a suction device of diameter above about twice the diameter of the first catheter, the adaptation of the curvatures further comprising at least two sets of symmetrically and directly opposing securing ribs, each such securing rib extending inward from an inner surface of the engagement wings' curvature at a tangent line of the curvature, whereby a distance between the nearest surfaces of a first set of opposing securing ribs is substantially less than the diameter of the first catheter and such securing rib separation is adapted to permit passage between the first set of opposing securing ribs the first catheter and thereafter maintaining its securement within a first space between the engagement wings curvature past the first set of opposing securing ribs such that the suction device with a diameter of above about twice the diameter of the first catheter may be secured and released in a second space between the engagement wings curvature without interfering with the securement of the first catheter in the first space;

(b) an adhesive plate with an upper side and a underside additionally whereby a dual sided adhesive means is adapted to effectively adhere on one side to the underside of the adhesive plate and on the other side to effectively adhere to cloth and smooth surfaces; and (c) an integral joint joining the catheter/tube engagement portion to the upper side of the adhesive plate such that catheters and suction devices are held substantially axially parallel with respect to each other.

* * * * *